(12) United States Patent
Kivinen et al.

(10) Patent No.: US 7,356,693 B2
(45) Date of Patent: Apr. 8, 2008

(54) METHOD FOR PRODUCING CERTIFICATE REVOCATION LISTS

(75) Inventors: Tero Kivinen, Helsinki (FI); Tomi Kause, Helsinki (FI)

(73) Assignee: SSH Communications Security Corporation, Helsinki (FI)

( * ) Notice: Subject to any disclaimer, the term of this patent is extended or adjusted under 35 U.S.C. 154(b) by 716 days.

(21) Appl. No.: 10/677,062

(22) Filed: Sep. 30, 2003

(65) Prior Publication Data

US 2004/0128504 A1      Jul. 1, 2004

(51) Int. Cl.
*H04L 9/00* (2006.01)

(52) U.S. Cl. .................. 713/158; 713/155; 713/156
(58) Field of Classification Search ................ 713/158, 713/156, 157
See application file for complete search history.

(56) References Cited

OTHER PUBLICATIONS http://technet2.microsoft.com/WindowsServer/en/library/45c28bf8-9952-4ca1-b124-7d86afb83f691033.mspx?pf=true.*
http://technet2.microsoft.com/WindowsServer/en/library/4ee4fe7e-136f-43fd-8bd3-f3d9766d82c91033.mspx?pf=true.*
http://java.sun.com/j2se/1.5.0/docs/guide/security/cert3.html.*
http://www.apacheweek.com/features/crl.*
http://www.cisco.com/application/pdf/en/us/guest/products/ps6664/c1650/cdccont_0900aecd80313df4.pdf, year 2004.*
Security aspects in standard certificate revocation mechanisms: a case study for OCSP Berbecaru, D.; Lioy, A.; Marian, M.; Computers and Communications, 2002. Proceedings. ISCC 2002. Seventh International Symposium on Jul. 1-4, 2002 pp. 484-489.*
Design of a certificate revocation platform Munoz, J.L.; Forne, J.; Information Technology: Research and Education, 2003. Proceedings. ITRE2003. International Conference on Aug. 11-13, 2003 pp. 259-263.*
Certificate revocation and certificate update Naor, M.; Nissim, K.; Selected Areas in Communications, IEEE Journal on vol. 18, Issue 4, Apr. 2000 pp. 561-570.*

\* cited by examiner

*Primary Examiner*—David Y Jung
(74) *Attorney, Agent, or Firm*—Ronald Craig Fish, A Law Corporation

(57) ABSTRACT

The practical benefit of the inventive idea results from an assumption that typically, the operational subCAs will not get compromised. Assuming this, a a batch of revocation lists manifesting no revocations can be generated and signed. These pregenerated CRLs (root CRLs) can then be stored outside the high-security vault and, in case of no subCA compromises, published periodically one at a time to the directory system where the PKI clients can automatically fetch them.

31 Claims, 4 Drawing Sheets

METHOD FOR PRODUCING CERTIFICATE REVOCATION LISTS

BACKGROUND OF THE INVENTION

1. Field of the Invention

The invention relates to methods for management of certificates in a public key infrastructure. Especially, the invention is related to such a method as specified in the preamble of the independent method claim.

2. Description of Related Art

Public-key infrastructure (PKI) provides means for reliably and securely performing authentication, ensuring message integrity, and providing non-repudiation of transactions in an online environment. PKI is based on the use of public-key (asymmetric) cryptography. In asymmetric cryptography the encryption and decryption of messages is done with different keys. This means that each participating entity (person or device) of the PKI has a set of two keys, a public key and a private key.

Private keys are secret and known only to their owners. Private keys are used for signing and decrypting messages. A common way to ensure the safety of a private key is to store it on a separate piece of hardware (a security token such as a smart card).

Public keys are, as the name implies, public and can be published, for example, in a public directory or on a Web server. Public keys are used for validating signatures and encrypting messages. The two keys are mathematically dependent but the private key cannot be derived from the public key. Furthermore, the two keys possess a distinct quality: what the public key encrypts can only be decrypted by the private key.

Before public-key operations can be made, the public key has to be received securely, so that no one can substitute the genuine key with a tampered one. Certificates can be used for distributing public keys of end entities.

Certificates are digital documents that are used for secure authentication of communicating parties. Certificates are also used for sending the public keys of entities to other entities. A certificate binds identity information about an entity to the entity's public key for a certain validity period. The digital signature of a trusted party makes certificates verifiable with the public key of the trusted party. Certificates can be thought of as analogous to passports that guarantee the identity of their bearers.

To enable wide usage of certificates and interoperable implementations from multiple vendors, certificates have to be based on standards. The most advanced and widespread certificate specifications at the moment are defined by the PKIX Working Group of the IETF (the Internet Engineering Task Force).

End entities are individual users or devices that transact with each other. End entities do not necessarily know each other and they need a way of finding out whether the other party of a transaction is trustworthy.

To enroll in a public-key infrastructure, an end entity needs to request certification for its public key from a certification authority (CA). Certification authorities are entities that vouch for the identity and trustworthiness of the certified end entities. The CA is a trusted third party that the end entities know to be trustworthy. By issuing certificates to the identified end entities, the CA indicates that it vouches for them. Certification authorities can be thought of as being analogous to governments issuing passports for their citizens. A valid certificate signed by a valid CA proves that an end entity is who or what she claims to be.

A certification authority can be operated by an external certification service provider, or even by a government, or the CA can belong to the same organization as the end entities. CAs can also issue certificates to other (sub) CAs. This leads to a tree-like certification hierarchy. The top CA in the tree is called a root CA. FIG. 1 shows a sample certification hierarchy. FIG. 1 shows a root CA 10, sub-CAs 20 directly certified by the root CA, sub-CAs 30 certified by one sub-CA 20, and end entities 40.

In some cases, a CA can delegate the actual identification of end entities as well as some other administrative tasks to a separate entity, the registration authority (RA). The RA performs the identification of the end entities and then signs the end-entity certification requests with its RA private key.

Because the CA has delegated the task of end-entity identification to the RA, the RA signature in the request gives the CA a guarantee of the right for end-entity certification. This allows the CA to operate automatically in online interaction while the local RAs perform the required out-of-band interaction with end entities.

Using local RAs a large geographically or operationally distributed PKI can work in a scalable way, even when the actual certificate issuing is centralized.

Certificate enrollment is an action in which a CA certifies a public key. The actual enrollment process consists of the following steps:
1. Generating a key pair.
2. End entity requesting certification for the public key.
3. CA or RA verifying the identity of the end entity.
4. CA generating a certificate for the end entity and making it available (if the request is approved).

End entities can use standard request formats for requesting certificates from a CA. The CA uses the underlying certificate policy to decide whether to approve the request or not. The policy decision and the approval/denial can be automatic, or the operator of the CA may have to approve the requests manually. If identification of the end entity is needed, the RA may perform this function. If the request is approved, a signed certificate will be issued and delivered to the end entity and possibly also published to a public directory.

Certificate Revocation

Certificates have pre-defined lifetimes, typically lasting from a couple of weeks to several years. If a private key of an end entity is compromised or the right to authenticate with a certificate is lost during the certificate's validity period, the certificate has to be revoked, and all PKI users have to be informed about this in some way. Certificate revocation lists are used for this purpose.

A certificate revocation list (CRL) is a list identifying the revoked certificates and it is signed by a CA. Each CA publishes CRLs on a regular basis. The publishing interval may vary from a couple of minutes to several hours, depending on the security policy of the CA. Verification of a certificate has to include the retrieval of the latest CRL to check that the certificate has not been revoked.

As the certificate revocation lists are updated on a periodic basis, they do not provide real-time status information. If more strict security is required, online certificate status services can be used. In Online Certificate Status Protocol (OCSP) a dedicated OCSP responder entity responds to status requests made by end entities. This kind of function is required for example in a PKI where high-value business transactions are digitally signed.

Certificates and CRLs need to be publicly available for the end entities that perform validation and encryption. A typical solution for publishing certificates is to use an LDAP directory or a Web server as a PKI repository. The Lightweight Directory Access Protocol (LDAP) has become the de facto standard procedure for CRL and certificate distribution.

In typical PKI hierarchies, the main function of the root CA is to certify a number of sub-CAs, which take care of the actual day-to-day work of the PKI. For security reasons, the root CA is often offline, possibly secured in a physically secured area, for example in a bank vault. Such an arrangement minimizes the security risks of the PKI hierarchy. In a large scale PKI the worst-case event in the threat model is the leakage of the root CA private key to an attacker: this would allow the attacker to perform any actions with the authority of the whole PKI hierarchy. Any other key compromise can be compensated for effortlessly and reliably within some predefined time window with the Certificate Revocation List mechanism. Recovering from the root key compromise requires updating the trust anchor at each and every piece of equipment which are part of the PKI, and this task cannot be performed with remote access in a secure manner, so this recovery process is very labor extensive, error-prone and expensive.

Having the root CA offline in a physically secure location prevents the leakage of the root secret key from happening. However, the root CA must anyway produce certificate revocation lists, which in the typical case merely indicate that the certificates of the sub-CAs are still valid. Production of such certificate revocation lists is a chore due to the high security measures: an operator needs to go in person to the root CA computer and manufacture the CRL.

SUMMARY OF THE VARIOUS EMBODIMENTS

An object of the invention is to realize a easier method of operating a PKI hierarchy. A further object of the invention is to reduce the practical work needed to produce and distribute of certificate revocation lists from the root CA.

The objects are reached by arranging the root CA to produce a plurality of certificate revocation lists in advance, the validity period of these certificate revocation lists forming a sequence, and issuing one of these pregenerated certificate revocation lists at a time if no security breaches of the concerned sub-CAs have been observed.

The method according to the invention is characterized by that, which is specified in the characterizing part of the independent method claim. The system according to the invention is characterized by that, which is specified in the characterizing part of the independent claim directed to a system. The computer program product according to the invention is characterized by that, which is specified in the characterizing part of the independent claim directed to a computer program product. The dependent claims describe further advantageous embodiments of the invention.

The practical benefit of the inventive idea results from an assumption that typically, the operational subCAs will not get compromised. Assuming this, a batch of revocation lists manifesting no revocations can be generated and signed. These pregenerated CRLs (root CRSs) can then be stored outside the high-security vault and, in case of no subCA compromises, published periodically one at a time to the directory system where the PKI clients can automatically fetch them.

The inventive idea is strongly against the prejudice of the field, since certification revocation lists are meant to describe the current status of affected certificates. Pregenerating certificate revocation lists for later use goes directly against this conception.

The inventive approach offers a high level of flexibility in trade-offs between security, ie. the difficulty for the attacker to obtain these CRLs, and convenience, ie. the amount of human intervention required for the periodic CRL updates to get published in the LDAP directory.

If maximal convenience is wished for, the CRLs can be stored on an on-line CA system in plaintext or encrypted with a secret which is stored in the system RAM at runtime. The root CRLs can therefore be automatically published without regular operator intervention.

If moderate convenience and a somewhat higher level of security is desired, the root CRLs can be stored on an on-line CA system encrypted with a secret which must be input by a human operator (potentially remotely via a trusted communication channel). The root CRLs get therefore published with minimal regular operator intervention, i.e., requiring only the input of the secret.

In a further advantageous embodiment of the invention, a sequence of CRLs is generated for each concerned sub-CA by the root CA for possible later use, each CRL in a particular sequence indicating the revocation of the particular sub-CA. In case of an actual security breach, one of these CRLs revoking the particular breached sub-CA can then be immediately published.

In a still further advantageous embodiment, the root CA is arranged to generate one sequence or batch pregenerate even one batch of root CRLs for each possible combination of revoked subCAs. Naturally, this embodiment of the invention is most advantageus in such cases, where the number of sub-CAs is small.

In a further advantageous embodiment of the invention, the root CA is arranged to generate and sign another batch of revocation lists which temporarily suspend (revoke revocation reason "certificateHold" which basically means reversible revocation) all the subCAs. These CRLs would get published in case of a hostile subCA compromise when it is crucial to minimize the time window where attacker can exploit the compromised key.

Temporary suspension is advantageous, since revoking the certificate of a CA causes a large amount of work: all certificates issued by the CA must be reissued to end entities. Temporary suspension allows the operators to publish a CRL at the first sign of a possible breach in the security of a sub-CA, investigate the situation, and publish a real revocation only after a real breach has been positively detected and the affected sub-CA identified. In effect, temporary suspension allows the operators to react to a mere possibility of breach, without having to judge the inconvenient consequences of a false alarm.

BRIEF DESCRIPTION OF THE DRAWINGS

Various embodiments of the invention will be described in detail below, by way of example only, with reference to the accompanying drawings, of which

DETAILED DESCRIPTION OF THE PREFERRED EMBODIMENTS

Figure 1:
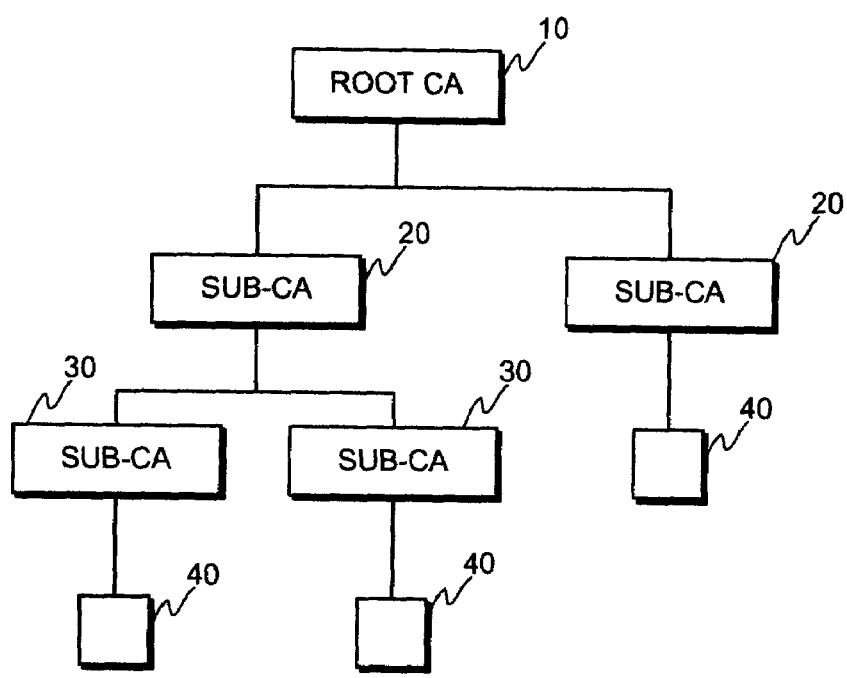
FIG. 1 illustrates a certificate authority hierarchy according to prior art.
Figure 2:
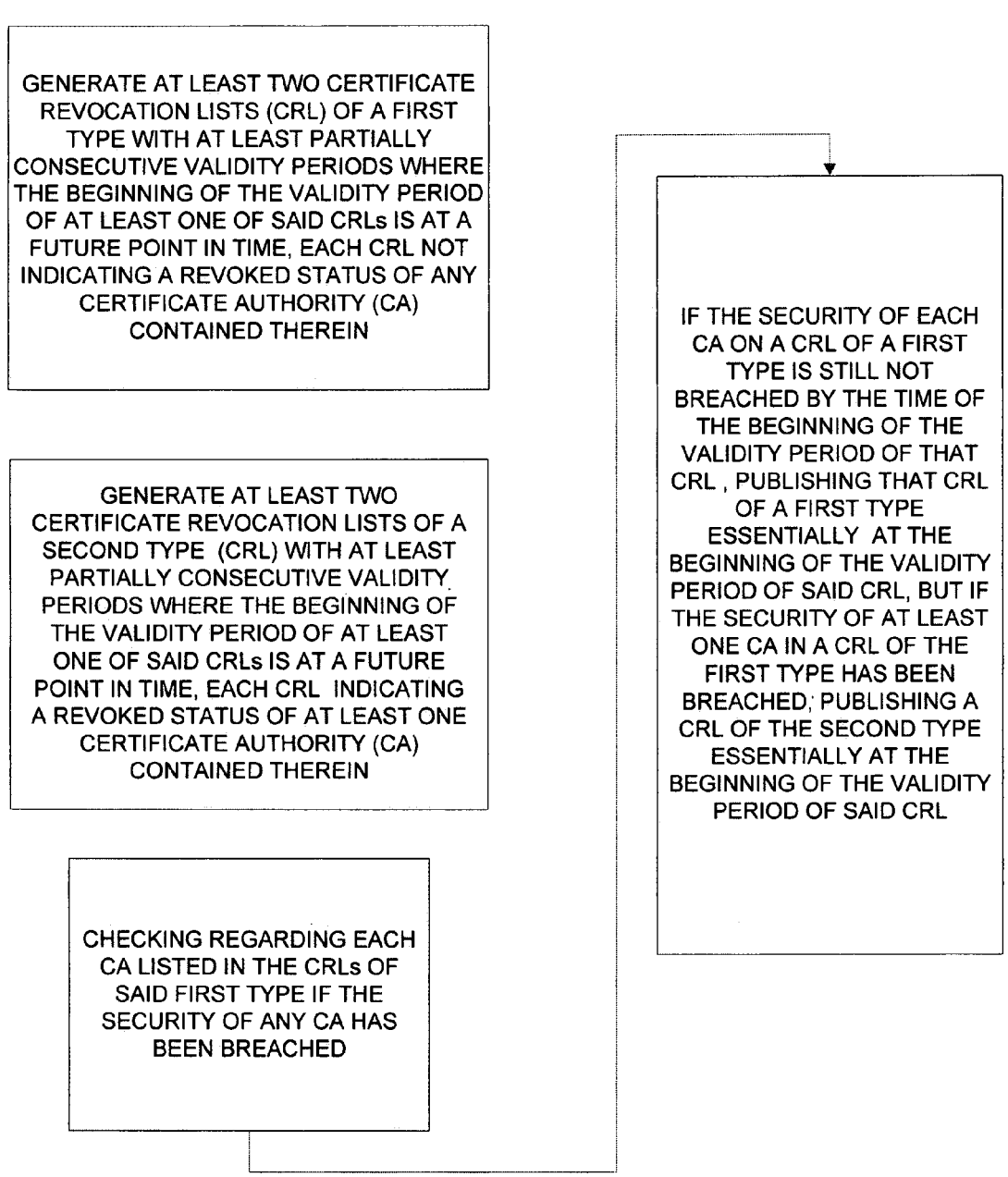
FIG. 2 is a flowchart of an embodiment of the invention.
Figure 3:
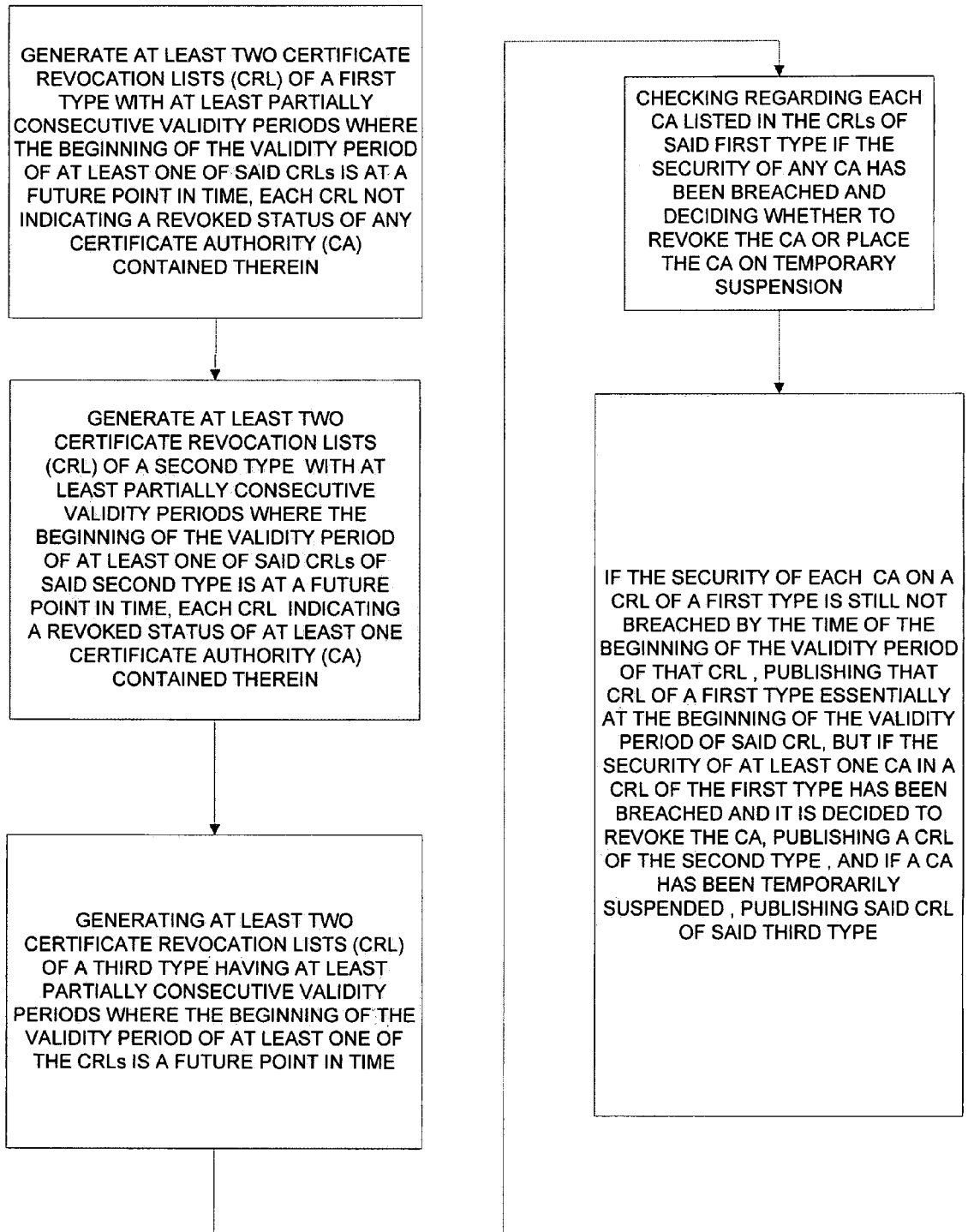
FIG. 3 is a flowchart of another embodiment of the invention.
Figure 4:
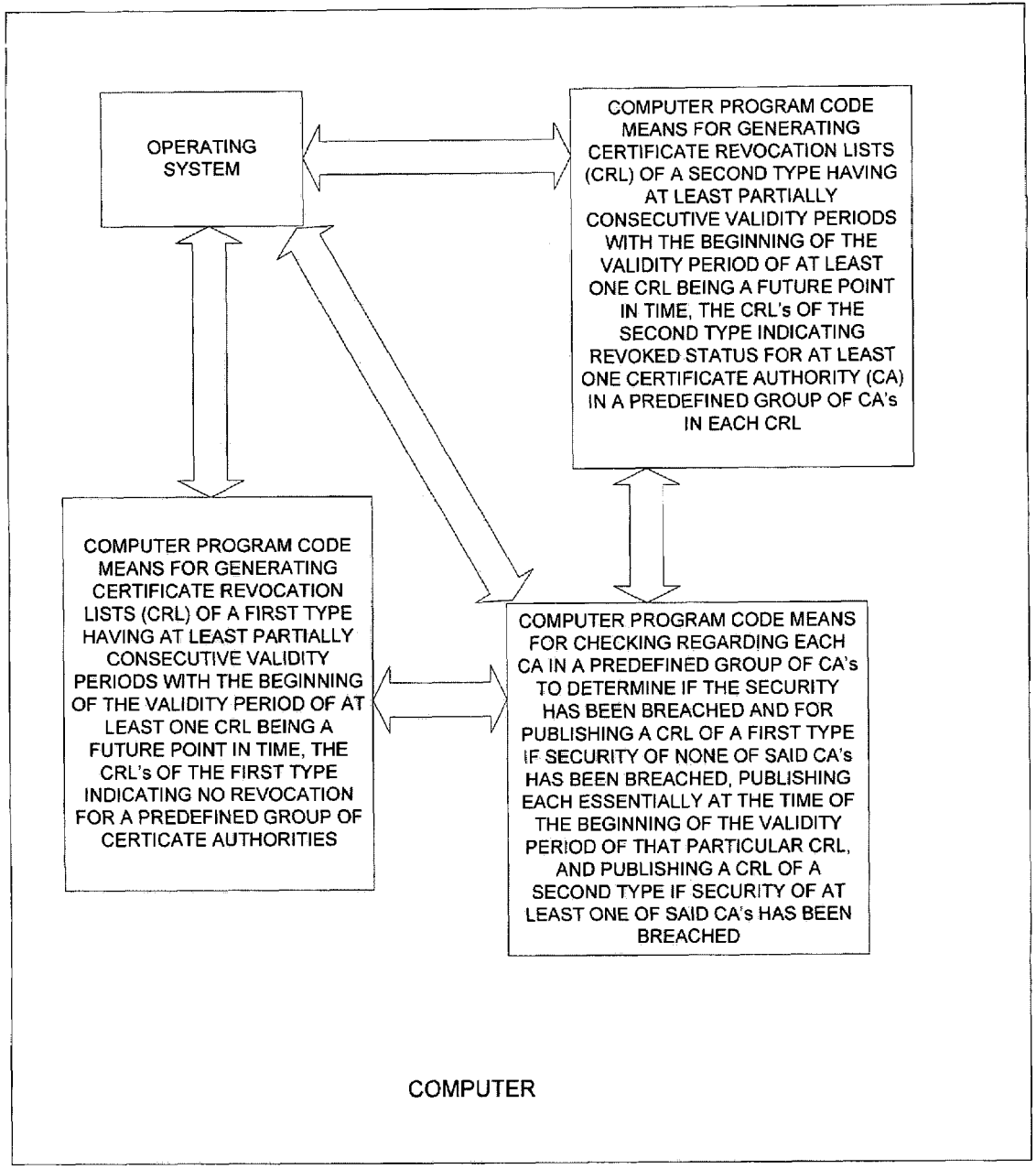
FIG. 4 is a diagram of the hardware and software architecture of an embodiment of the invention.

The exemplary embodiments of the invention presented in this description are not to be interpreted to pose limitations to the applicability of the appended claims. The verb "to comprise" is used as an open limitation that does not exclude the existence of also unrecited features. The features recited in depending claims are mutually freely combinable unless otherwise explicitly stated.

According to a first aspect of the invention a method for managing certificates in a certificate authority in a system having at least a first plurality of certificate authorities is provided. According to an advantageous embodiment of the invention the method comprises the step of generating at least two certificate revocation lists of a first type, each of said at least two certificate revocation lists of a first type not indicating a revoked status of any certificate authority in said at least a first plurality of certificate authorities, said at least two certificate revocation lists of a first type having at least partially consecutive validity periods, where the beginning of the validity period of at least one of said at least two certificate revocation lists of a first type is a future point of time, publishing said certificate revocation lists of a first type one at a dine, each essentially at the time of the beginning of the validity period of that particular certificate revocation list.

According to a further advantageous embodiment of the invention, the method further comprises the steps of checking regarding each of certificate authorities listed in said certification revocation lists of a first type if the security of each of certificate authorities has been breached or not; and if the security of none of said certificate authorities has been breached, publishing one of said certificate revocation lists of a first type.

According to a further advantageous embodiment of the invention, the method further comprises the steps of generating at least two certificate revocation lists of a second type, each of said at least two certificate revocation lists of a second type indicating a revoked status of at least one certificate authority in said at least a first plurality of certificate authorities, said at least two certificate revocation lists of a second type having at least partially consecutive validity periods, where the beginning of the validity period of at least one of said at least two certificate revocation lists of a second type is a future point of time.

According to a further advantageous embodiment of the invention, the method further comprises the steps of checking regarding each of certificate authorities in said at least a first plurality of certificate authorities if the security of each of certificate authorities has been breached or not; and if the security of none of said certificate authorities has been breached, publishing one of said certificate revocation lists of a first type, and if the security of at least one of said certificate authorities has been breached, publishing one of said certificate revocation lists of a second type.

According to a further advantageous embodiment of the invention, the method further comprises the steps of generating for each certificate authority in said at least a first plurality of certificate authorities if the security of each of certificate a series of certificate revocation lists which indicate a revoked status of said certificate authority.

According to a further advantageous embodiment of the invention, the method further comprises the steps of generating at least two certificate revocation lists of a third type, each of said at least two certificate revocation lists of a third type indicating a temporarily suspended status of at least one certificate authority in said at least a first plurality of certificate authorities, said at least two certificate revocation lists of a third type having at least partially consecutive validity periods, where the beginning of the validity period of at least one of said at least two certificate revocation lists of a third type is a future point of time.

According to a second aspect of the invention, a system for a certificate authority having means for generating certificate revocation lists is provided. According to an advantageous embodiment of the invention, the system comprises means for generating sequences of certificate revocation lists of a first type having at least partially consecutive validity periods, the beginning of the validity period of at least one of said revocation lists of a first type being a future point of time relative to the time of generating a sequence of certificate revocation lists, said certificate revocation lists of a first type indicating no revocation for a predefined group of certificate authorities.

According to a further advantageous embodiment of the invention, the system further comprises means for publishing said certificate revocation lists of a first type one at a time, each essentially at the time of the beginning of the validity period of that particular certificate revocation list.

According to a further advantageous embodiment of the invention, the system further comprises means for generating sequences of certificate revocation lists of a second type having at least partially consecutive validity periods, the beginning of the validity period of at least one of said revocation lists of a second type being a future point of time relative to the time of generating a sequence of certificate revocation lists, and means for generating an indication of a revoked status of at least one certificate authority in said predefined group of certificate authorities in each certificate revocation list generated by said means for generating sequences of certificate revocation lists of a second type.

According to a further advantageous embodiment of the invention, the system further comprises means for checking regarding each of certificate authorities in said predefined group of certificate authorities if the security of each of said certificate authorities has been breached or not; means for publishing one of said certificate revocation lists of a first type if the security of none of said certificate authorities has been breached, and means for publishing one of said certificate revocation lists of a second type if the security of at least one of said certificate authorities has been breached.

According to a third aspect of the invention, a computer program product for a certificate authority having computer code means for generating certificate revocation lists is provided. According to an advantageous embodiment of the invention, the computer program product comprises means for generating sequences of certificate revocation lists of a first type having at least partially consecutive validity periods, the beginning of the validity period of at least one of said revocation lists of a first type being a future point of time relative to the time of generating a sequence of certificate revocation lists, said certificate revocation lists of a first type indicating no revocation for a predefined group of certificate authorities.

According to an advantageous embodiment of the invention, the computer program product comprises computer code means for publishing said certificate revocation lists of a first type one at a time, each essentially at the time of the beginning of the validity period of that particular certificate revocation list.

According to an advantageous embodiment of the invention, the computer program product comprises computer code means for generating sequences of certificate revocation lists of a second type having at least partially consecutive validity periods, the beginning of the validity period of at least one of said revocation lists of a second type being a future point of time relative to the time of generating a sequence of certificate revocation lists, and computer code means for generating an indication of a revoked status of at least one certificate authority in said predefined group of certificate authorities in each certificate revocation list generated by said means for generating sequences of certificate revocation lists of a second type.

According to an advantageous embodiment of the invention, the computer program product comprises computer code means for checking regarding each of certificate authorities in said predefined group of certificate authorities if the security of each of said certificate authorities has been breached or not; computer code means for publishing one of said certificate revocation lists of a first type if the security of none of said certificate authorities has been breached, and computer code means for publishing one of said certificate revocation lists of a second type if the security of at least one of said certificate authorities has been breached.

The computer program product can be implemented in many different ways. For example, the computer program product can be implemented as an application program executed in a computer device or as an application program stored on a computer readable media such as a hard disk, a CD-ROM, an electronic memory module, or on other media. The computer program product can also be implemented as a subroutine library for inclusion in other programs.

The invention has been described using some particular advantageous embodiments as examples. However, various implementations of the invention are not limited to the described examples, and the invention can be realized in many different ways within the scope of the attached patent claims.

The invention claimed is:

1. Method carried out on a computer for managing certificates in a certificate authority in a system having at least a first plurality of certificate authorities, comprising at least the steps of
    using a computer to generate a first certificate revocation list of a first type and having a first validity period,
    using a computer to generate a second certificate revocation list of a first type wherein said second certificate revocation list has a validity period which is at least partially consecutive with said first validity period and which has a beginning time which is a future point in time; and
    each of said first and second certificate revocation lists of a first type listing one or more certificate authorities, and not indicating a revoked status of any said certificate authority in said at least a first plurality of certificate authorities.

2. Method according to claim 1, comprising at least the steps of
    publishing at least said first and second certificate revocation lists of a first type one at a time, each essentially at the time of the beginning of the validity period of that particular certificate revocation list.

3. Method according to claim 1, comprising at least the steps of
    checking regarding each of said certificate authorities listed in said certification revocation lists of a first type if the security of each of said certificate authorities has been breached or not;
    and if the security of none of said certificate authorities has been breached publishing one of said certificate revocation lists of a first type having the appropriate validity period for the time of publication.

4. Method according to claim 1, further comprising at least the steps of
    using a computer to generate at least first and second certificate revocationlists (CRLs) of a second type,
    each of said at least first and second certificate revocation lists of a second type indicating a revoked status of at least one said certificate authority in said at least a first plurality of certificate authorities,
    said first and second certificate revocation lists of a second type having at least partially consecutive validity periods,
    and wherein the beginning of the validity period of said second certificate revocation list of a second type is a future point of time.

5. Method according to claim 4, further comprising at least the steps of
    checking regarding each of said certificate authorities in said at least a first plurality of certificate authorities if the security of each of said certificate authorities has been breached or not;
    and if the security of none of said certificate authorities has been breached, publishing said first of said first and second certificate revocation lists of a first type,
    and if the security of at least one of said certificate authorities has been breached after publication of said first of said first and second certificate revocation lists of said first type, publishing at least one of said certificate revocation lists of a second type.

6. Method according to claim 4, further comprising at least the steps of
    using a computer to generate for each certificate authority in said at least a first plurality of certificate authorities, if the security of a certificate authority has been breached, at least one certificate revocation list of a second type in a series of certificate revocation lists of said second type which indicates a revoked status of said certificate authority.

7. Method according to claim 1, comprising at least the steps of
    using a computer to generate at least first and second certificate revocation lists of a third type,
    each of said at least first and second certificate revocation lists of a third type indicating a temporarily suspended status of at least one certificate authority in said at least a first plurality of certificate authorities,
    said at least first and second certificate revocation lists of a third type having at least partially consecutive validity periods,
    where the beginning of the validity period of at least one of said first and second revocation lists of a third type is a future point of time.

8. An apparatus for managing certificate revocation lists for a certificate authority having comprising at least:
    a computer programmed with an operating system and one or more programs which cooperate with said operating system to control said computer to perform the following process:
        generating sequences of certificate revocation lists of a first type having at least partially consecutive validity periods, the beginning of the validity period of at least one of said revocation lists of a first type being a future point of time relative to the time of generating a sequence of certificate revocation lists, and wherein said certificate revocation lists of said first type indicating no revocation for a predefined group of certificate authorities.

9. An apparatus according to claim 8, wherein said one or more programs further comprise program code which controls said computer to publish said certificate revocation lists of a first type one at a time, each essentially at the time of the beginning of the validity period of that particular certificate revocation list.

10. An apparatus according to claim 8, wherein said one or more programs further comprise program code which controls said computer to perform the following additional steps:

generating sequences of certificate revocation lists of a second type having at least partially consecutive validity periods, the beginning of the validity period of at least one of said revocation lists of a second type being a future point of time relative to the time of generating a sequence of certificate revocation lists, and generating an indication of revoked status of at least one certificate authority in said predefined group of certificate authorities in each certificate revocation list generated by said means for generating sequences of certificate revocation lists of a second type.

11. An apparatus according to claim 10, wherein said one or more programs further comprise program code which controls said computer to perform the following additional steps:

checking regarding each of certificate authorities in said predefined group of certificate authorities if the security of each of said certificate authorities has been breached or not:

publishing one of said certificate revocation lists of said first type if the security of none of said certificate authorities has been breached, and publishing one of said certificate revocation lists of said second type if the security of at least one of said certificate authorities has been breached.

12. A computer-readable medium having stored thereon computer program code for controlling a computer to generate certificate revocation lists using the following process, comprising at least generating sequences of certificate revocation lists of a first type having at least partially consecutive validity periods, the beginning of the validity period of at least one of said revocation lists of a first type being a future point of time relative to the time of generating a sequence of certificate revocation lists, said certificate revocation lists of a first type indicating no revocation for a predefined group of certificate authorities.

13. The computer-readable medium as defined in claim 12, wherein said computer program code further comprises computer program code for controlling said computer to publish said certificate revocation lists of a first type one at a time, each essentially at the time of the beginning of the validity period of that particular certificate revocation list.

14. The computer-readable medium as defined in claim 12, wherein said computer program code stored on said medium further comprises code for controlling said computer to perform the following additional process steps:

generating in advance a sequence of certificate revocation lists of a second type having at least partially consecutive validity periods, the beginning of the validity period of at least one of said revocation lists of a second type being a future point of time relative to the time of generating a sequence of certificate revocation lists, and generating an indication of revoked status of at least one certificate authority in said predefined group of certificate authorities in each of said certificate revocation lists of said second type generated in advance.

15. A computer readable medium as defined in claim 14, wherein said computer program code stored on said medium further comprises code for controlling said computer to perform the following additional process steps:

checking for security breaches regarding each of said certificate authorities in said predefined group of certificate authorities;

publishing one of said certificate revocation lists of a first type if the security of none of said certificate authorities has been breached, and publishing one of said certificate revocation lists of a second type if the security of at least one of said certificate authorities has been breached.

16. A process carried out on a computer for managing root certificates revocation lists (root CRLs) for sub-Certificate Authorities (sub-CAs) in a certificate authority comprising at least the steps of:

A) using a computer to generate in advance a plurality of certificate revocation lists CRL) of a first type having partially consecutive validity periods which may have overlap in time of coverage of said validity periods but the sequence of validity periods of said CRLs of said first type have no gaps in time, the beginning in time of the validity period of each CRL of said first type after a first of said CRLs of said first type being a future point in time, and wherein none of said CRLs of said first type indicate revoked status for any sub-CA;

B) using a computer to generate in advance for each sub-CA a sequence of CRLs of a second type having partially consecutive validity periods which may have overlap in time of coverage of said validity periods but the sequence of validity periods of said CRLs of said second type having no gaps in time, the beginning in time of the validity period of each CRL of said second type after a first of said CRLs of said second type being a future point in time, and wherein each of said CRLs of said second type indicate revoked status for the particular sub-CA to which said second CRL of said second type pertains;

(C) repeating step B for each sub-CA so as to generate in advance a separate sequence of CRLs of said second type for each sub-CA;

(D) as the beginning of the validity period of each said CRL of said first type approaches, checking to determine if the security of any sub-CA has been breached, and, if not, publishing a CRL of said first type, and, if the security of a sub-CA has been breached, selecting a CRL of said second type indicating revoked status for said sub-CA whose security has been breached and having an appropriate validity period and publishing said selected CRL of said second type.

17. The process of claim 16 further comprising the step of storing at least one of said CRLs of said first and second type in an on-line system.

18. The process of claim 17 further comprising the step of storing at least one of said CRLs of said first and second type in a plaintext form.

19. The process of claim 17 further comprising the step of storing at least one of said CRLs of said first and second type in encrypted form.

20. The process of claim 19 further comprising the step of encrypting said at least one of said CRLs of the first and second type with a secret, said secret being either a secret stored in memory or a secret entered by an operator.

21. A process carried out on a computer for managing root certificates revocation lists (root CRLs) for sub-Certificate Authorities (sub-CAs) in a certificate authority comprising at least the steps of:
A) using a computer to generate in advance a plurality of certificate revocation lists CRL) of a first type having partially consecutive validity periods which may have overlap in time of coverage of said validity periods but the sequence of validity periods of said CRLs of said first type have no gaps in time, the beginning in time of the validity period of each CRL of said first type after a first of said CRLs of said first type being a future point in time, and wherein none of said CRLs of said first type indicate revoked status for any sub-CA;
(B) as the beginning of the validity period of each said CRL of said first type approaches, checking to determine if the security of any sub-CA has been breached, and, if not, publishing a CRL of said first type, and, if the security of a sub-CA has been breached, discarding the CRL of said first type with the beginning of the validity period which is approaching and using a computer to generate and publish a new CRL of a second type indicating at least revoked status for said sub-CA whose security has been breached, said CRL of said second type generated in this step having a validity period which is partially consecutive with the validity period of said CRL of said first type such that there is no gap in time between the end of the validity period of said CRL of said first type and the validity period of said CRL of said second type generated in this step B.

22. The process of claim 21 further comprising the step of storing at least one of said CRLs in an on-line system.

23. The process of claim 22 further comprising the step of storing at least one of said CRLs of said first and second type in a plaintext form.

24. The process of claim 22 further comprising the step of storing at least one of said CRLs of said first and second type in encrypted form.

25. The process of claim 24 further comprising the step of encrypting said at least one of said CRLs of the first and second type with a secret, said secret being either a secret stored in memory or a secret entered by an operator.

26. A process carried out on a computer for managing root certificates revocation lists (root CRLs) for sub-Certificate Authorities (sub-CAs) in a certificate authority comprising at least the steps of:
A) using a computer to generate in advance a plurality of certificate revocation lists CRL) of a first type having partially consecutive validity periods which may have overlap in time of coverage of said validity periods but the sequence of validity periods of said CRLs of said first type have no gaps in time, the beginning in time of the validity period of each CRL of said first type after a first of said CRLs of said first type being a future point in time, and wherein none of said CRLs of said first type indicate revoked status for any sub-CA;
B) using a computer to generate in advance for each possible subcombinations of sub-CA a sequence of CRLs of a second type, each sequence having partially consecutive validity periods which may have overlap in time of coverage of said validity periods but the sequence of validity periods of said CRLs of said second type having no gaps in time, the beginning in time of the validity period of each CRL of said second type after a first of said CRLs of said second type being a future point in time, and wherein each of said CRLs of said second type in each said sequence of CRLs of said second type indicating revoked status for one subcombinations of sub-CAs;
(C) as the beginning of the validity period of each said CRL of said first type approaches, checking to determine if the security of any sub-CA or sub-combination of sub-CAs has been breached, and, if not, publishing a CRL of said first type, and, if the security of any sub-CA or subcombination of sub-CAs has been breached, selecting a CRL of said second type indicating revoked status for said sub-CA or sub-combination of sub-CAs whose security has been breached and having an appropriate validity period and publishing said selected CRL of said second type.

27. The process of claim 26 further comprising the step of storing at least one of said CRLs in an on-line system.

28. The process of claim 27 further comprising the step of storing at least one of said CRLs of said first and second type in a plaintext form.

29. The process of claim 27 further comprising the step of storing at least one of said CRLs of said first and second type in encrypted form.

30. The process of claim 29 further comprising the step of encrypting said at least one of said CRLs of the first and second type with a secret, said secret being either a secret stored in memory or a secret entered by an operator.

31. System for a certificate authority having means for generating certificate revocation lists, comprising at least
means for generating sequences of certificate revocation lists of a first type having at least partially consecutive validity periods, the beginning of the validity period of at least one of said revocation lists of a first type being a future point of time relative to the time of generating a sequence of certificate revocation lists,
means for generating sequences of certificate revocation lists of a second type and a third type, each sequence having at least partially consecutive validity periods;
said certificate revocation lists of a first type indicating no revocation for a predefined group of certificate authorities, and said certificate revocation lists of said second type indicating a revoked status for one or more certificate authorities, and said certificate revocation lists of said third type indicating a temporarily suspended status of a certificate authority; and
means for checking for security breaches of said certificate authorities before the beginning of the validity period of each certificate revocation list in said sequence of certificate revocation lists of said first type, and if no security breach has occurred publishing a certificate revocation list of a first type, and if a security breach has definitely occurred, selecting a certificate revocation list of a second type having an appropriate validity period and publishing it, and if it is not clear whether a security breach for one or more certificate authorities has occurred, selecting and publishing a certificate revocation list of a third type having an appropriate validity period and indicating a temporarily suspended status for the one or more certificate authorities whose security might have been breached.

* * * * *